UNITED STATES PATENT OFFICE.

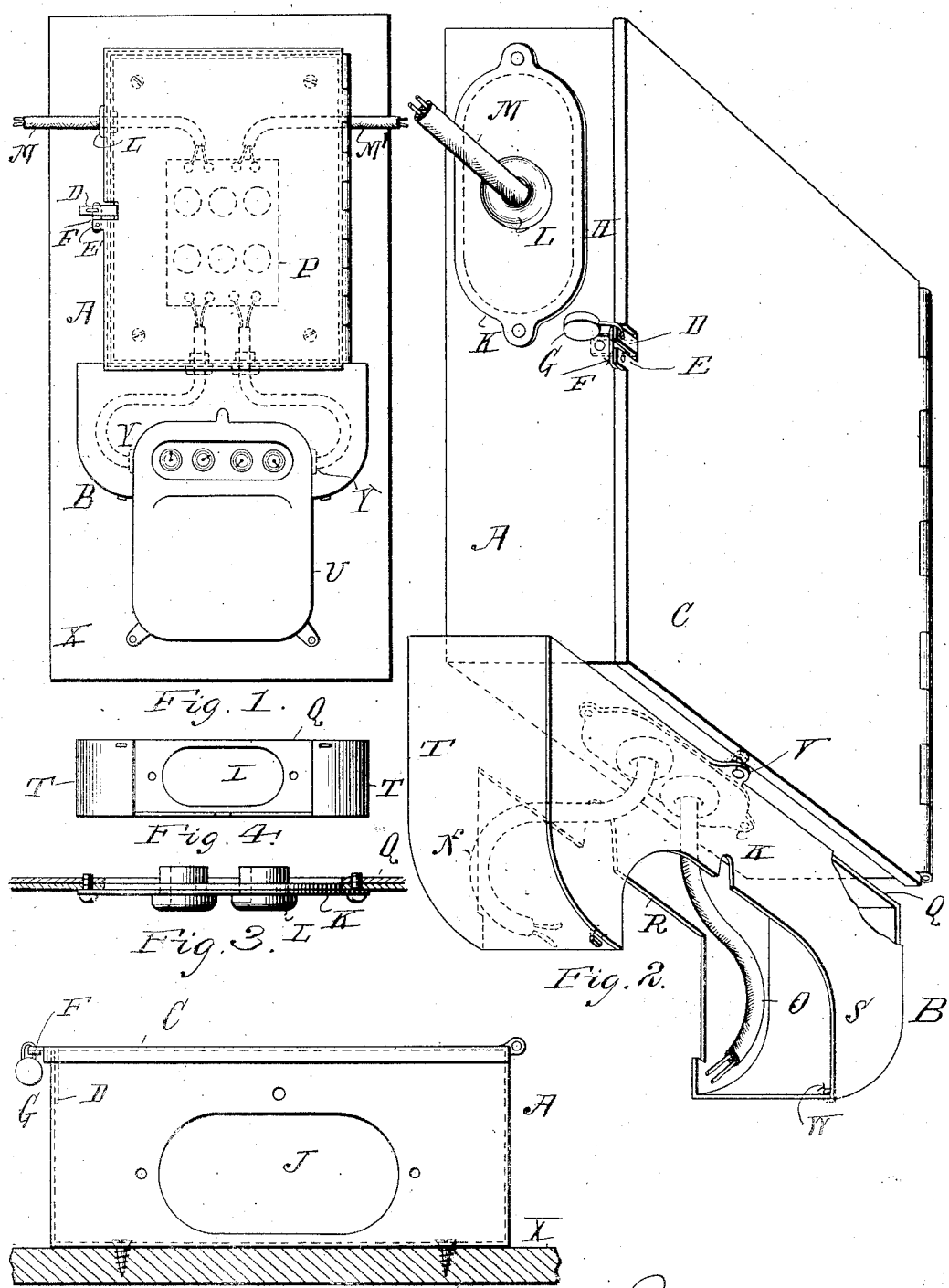

PERCY H. BARTLETT, OF PHILADELPHIA, PENNSYLVANIA.

PROTECTING DEVICE FOR METER CONNECTIONS.

1,036,423.

Specification of Letters Patent.

Patented Aug. 20, 1912.

Application filed March 19, 1912. Serial No. 684,770.

*To all whom it may concern:*

Be it known that I, PERCY H. BARTLETT, a subject of the King of Great Britain, residing at Philadelphia, in the county of Philadelphia and State of Pennsylvania, have invented a certain new and useful Improvement in Protecting Devices for Meter Connections, of which the following is a specification.
The invention is a case for the connection box and conductors associated with an electric meter, and has for its object to prevent access to said box and the circuit terminals.
The invention consists in the construction hereinafter set forth, whereby the device is simplified and made readily applicable to any form of meter casing. To this end, I construct said device in two parts, namely, a simple metal box, which contains the connection block and is provided with a hinged door, and a metal adapter box separate from said connection box, which is interposed between said connection box and the meter, and which is provided with recesses in its cover and rear wall into which fits the end of the meter casing whereon the meter circuit terminals are located. Said casing thus closes said recesses and enters the same sufficiently far to permit the terminals on said casing to be completely inclosed by said adapter box. The meter conductors are led into the adapter box through registering openings in the juxtaposed walls of connection box and adapter box and are connected to said terminals. The cover of the adapter box forming the front wall thereof is secured in place so that it cannot be removed without opening the door of the connection box, and said door in turn is secured by a seal fastening.

In the accompanying drawings—Figure 1 represents, in plan view and assembled, the connection box, the adapter box and a meter casing, the circuit conductors and connections being shown in dotted lines. Fig. 2 is a perspective view showing the connection box and adapter box separate from the meter casing. Fig. 3 shows in edge view a closing plate applied to the opening in the connection box which registers with the opening in the top wall of the adapter box. Fig. 4 is an elevation of the adapter box B, and Fig. 5 an end elevation of the connection box A.

Similar letters of reference indicate like parts.

A is the connection box and B the adapter box. The box A is preferably of sheet metal and comprises a back, walls and a hinged door C flanged at its edges. On one wall is a projecting lug D, having an opening. On the door is a lug E, to which is pivoted an arm F, also having an opening. When the door is closed, the lug D enters a recess in the edge thereof and comes flush with lug E, so that the arm F can be swung under said lug D, thus latching said door. The lug D and arm F are then secured together by the shackle of a seal fastening G, which is passed through them. In the walls of box A are openings J, closed by plates H, K bolted to said walls. In each plate are inserted one or more insulating bushings L, depending upon the number of conductors to be led into or out of the box. Thus, in Fig. 2, the plate H in the side wall has one bushing L, receiving the conductor M, and the plate K in the bottom wall has two bushings, receiving the meter conductors N, O. The box A is to be made of sufficient dimensions to inclose a connection block P, (dotted lines Fig. 1) of any suitable type, to which block the line conductors M, M' and the meter conductors N, O are connected in the usual way.

The adapter box B has a top wall Q, rear wall R, cover or front wall S and side walls T. The top wall Q has an opening I registering with the opening J in the lower wall of box A. In the back wall R and cover S are formed recesses, which are shaped to conform to and to receive the meter casing U, (see Fig. 1) so that said meter casing may enter said recesses and so close the opening. The depth of the recess depends on the position of the terminals Y on the meter casing. Said casing should extend into the adapter box sufficiently far to cause said box completely to inclose said terminals. The side walls T are preferably curved and extend to the edges of said recesses. On the cover S is a lug V, through which passes a headed bolt which also passes through the wall of box A, and is secured by a nut within said box: and on the bottom edges of said cover S are hooks W which engage in openings in the walls T.

It is to be understood that whatever the configuration of the meter casing may be the recesses in wall R and cover S of adapter box B are to be made to conform thereto, so that said casing will always close the opening formed by said recesses in the bottom of the adapter box. The box A and the meter casing may be secured upon any suitable back-board, as X.

In using the device, the connection box A is first secured to back-board X and the connections made to block P. The meter conductors N, O are led through the bushings in plate K, which is secured within the box A. The adapter box B, with the cover S removed, is then placed with its top wall Q against the lower wall of box A, and the meter casing U is inserted in the recess formed for it in wall R and cover S, at Y, so that the terminals become inclosed in said adapter box. The meter conductors N, O are attached to the meter terminals. The cover S is placed in position with the hooks W in engagement, and the bolt is inserted through lug V and the bottom wall of the connection box A. Lastly, the door C is closed and the seal fastening G applied, as already described. When the device is closed, the connection block, circuit terminals thereon, meter conductors and meter terminals are all completely protected. It can be readily installed and connected without any additional fittings, and independent of the position or method of installation of the supply and customer's wires.

I claim:

1. A meter casing, a connection box, an adapter box disposed between said casing and said connection box, and means for releasably securing said adapter box to said connection box; the said adapter box having a top wall, side walls and front and rear walls, the said top wall being secured against a wall of said connection box and having openings for circuit conductors leading from said connection box, the said front and rear walls having recesses of suitable configuration to fit upon and receive the end of the meter casing on which the meter circuit terminals thereof are located, and the said side walls at their lower edges making contact with the side walls of said meter casing.

2. A meter casing, a connection box, an adapter box disposed between said casing and said connection box, means operable within said connection box for releasably securing said adapter box to said connection box, a closure for said connection box, and locking means for said closure; the said adapter box having a top wall, side walls and front and rear walls, the said top wall being secured against a wall of said connection box and having openings for circuit conductors leading from said connection box, the said front and rear walls having recesses of suitable configuration to fit upon and receive the end of the meter casing on which the meter circuit terminals thereof are located, and the said side walls at their lower edges making contact with the side walls of said meter casing.

In testimony whereof I have affixed my signature in presence of two witnesses.

PERCY H. BARTLETT.

Witnesses:
 GERTRUDE T. PORTER,
 MAY T. McGARRY.